Oct. 22, 1963     C. A. TIPTON     3,107,587
DISPOSABLE CAKE PAN AND METHOD OF MAKING SAME
Filed Jan. 29, 1962
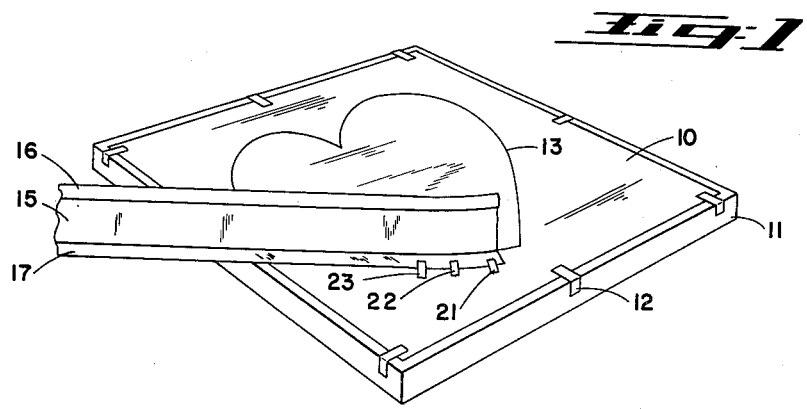
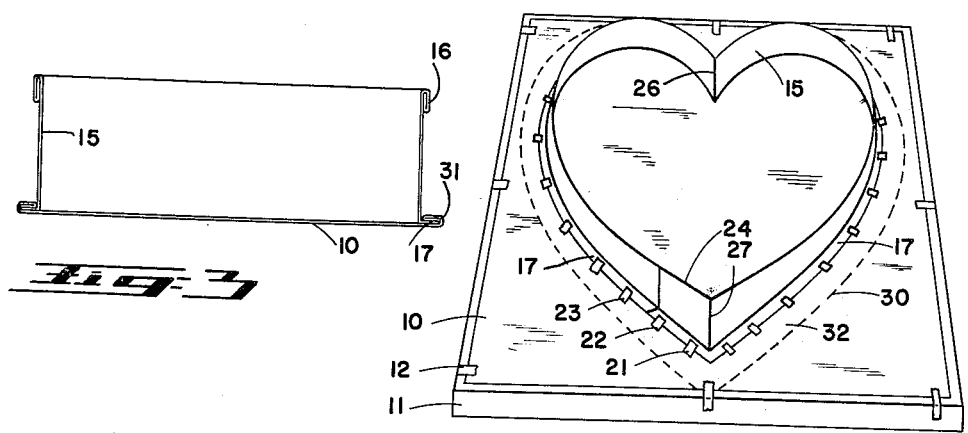
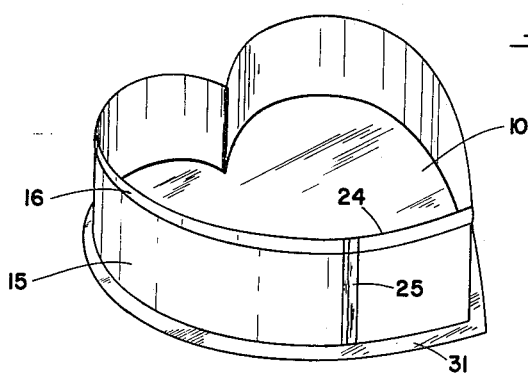
INVENTOR.
CATHERINE A. TIPTON
BY
ATTORNEY United States Patent Office 3,107,587
Patented Oct. 22, 1963

3,107,587
DISPOSABLE CAKE PAN AND METHOD OF MAKING SAME
Catherine A. Tipton, P.O. Box 1202, Roseburg, Oreg.
Filed Jan. 29, 1962, Ser. No. 172,366
3 Claims. (Cl. 93—36)

This invention relates to disposable cake pans and a method of making such pans in different shapes and sizes as may be desired by the user.

When it is desired to make cakes in different and unusual shapes and sizes, it is often found that suitable pans are not obtainable. Even if available, a large number of such pans would constitute a considerable investment and inconvenience in storing them when the same configurations are not frequently used. In any event, conventional cake pans in novelty shapes are very limited in variety, whereby the user of conventional equipment does not have a wide choice of cake configurations for special events, children's parties and other occasions.

The general object of the present invention is, therefore, to provide a novel method which may be easily carried out by the average housewife for making cake pans of any desired size and shape using readily available, inexpensive, disposable materials whereby the pans may be discarded after each use, if desired.

Another object is to provide a novel method for making cake pans in intricate shapes to produce cakes resembling animals, fairy tale characters, and the like.

Another object is to provide a method of making cake pans of metal foil.

In accordance with the present invention, the cake pan is made from two pieces of somewhat stiff but flexible material, such as aluminum foil which is readily available in rolls for other cooking and wrapping purposes. One piece of foil forms the bottom of the pan and another piece is folded in a manner to form a reinforced side wall which may be bent to the shape desired. One of the folds in the wall member forms a bottom flange which is secured to the bottom member by folding the margin of the bottom member over such flange. The parts may be secured firmly together in the proper relationship by pieces of adhesive tape. In this way a very intricate outline may be produced and the choice of shapes is virtually unlimited.

The invention will be better understood and additional objects and advantages will become apparent from the following description of a preferred embodiment illustrated on the accompanying drawing. It is to be understood, however, that various changes may be made in the construction and arrangement of parts and that all such modifications within the scope of the appended claims are included in the invention.

In the drawing:

FIGURE 1 is a perspective view illustrating a step in the method of making a cake pan in accordance with the invention;

FIGURE 2 is a perspective view showing a subsequent stage in the making of the cake pan;

FIGURE 3 is a cross sectional view of the completed cake pan; and

FIGURE 4 is a perspective view of the completed pan.

In making a cake pan according to the invention, a flat sheet of foil 10 is first secured to a cooky sheet 11 by pieces of adhesive tape 12. If a heavy foil is used, a single thickness will suffice, but if a thin foil is used and the dimensions of the pan are rather large, plural thicknesses of foil should be used, either by folding over a single large sheet or by superimposing a number of the individual sheets 10. The sheet 10 forms the bottom of the pan and will hereinafter be referred to in the singular, although it is to be understood that the pan bottom may comprise plural thicknesses of foil. On the sheet 10 is drawn an outline 13 of the shape of pan which is desired. This outline may be sketched freehand or it may be traced from a pattern.

A second sheet of foil 15 forms the side wall of the pan. Here, again, if the foil is heavy and the pan is small, a single thickness will suffice, but if the foil is thin and the pan large or deep, a wide strip may be folded over once or twice to provide plural thicknesses of foil in the desired height of side wall. To provide reinforcement for the top edge, the foil is double folded longitudinally at 16, which makes the rim of the pan sufficiently stiff to avoid distortion in the shape desired under the pressure of the batter. Along the lower edge of the strip 15 a flange 17 is folded to stand out perpendicular to the strip.

Then, starting at some convenient point on the outline 13, the bottom flange 17 is secured at one end to the bottom sheet 10 by a first piece of adhesive tape 21 as shown in FIGURE 1. The side wall may be curved around the outline 13 and secured in place at intervals by additional pieces of adhesive tape 22 and 23 on the bottom flange 17. Proceeding in this fashion, the side wall is mounted to the base sheet 10 entirely around the outline 13 until the ends of this wall strip overlap at 24, as shown in FIGURE 2. The vertical joint formed by the overlapped ends of the wall strip may be secured together and sealed by a piece of adhesive tape 25 applied on the outside of the wall as shown in FIGURE 4. Pressure sensitive tape is preferred.

In bending the wall strip 15 around the long radius curves, the strip may be shaped and conformed to the outline 13 by working it with the fingers. On short radius bends the wall strip may be pressed to shape around a pencil or other solid object of suitable curvature. Where a reentrant cusp is encountered as at 26 in the heart design shown, the wall strip may be creased over the back edge of a knife blade. The point 27 is formed in the same way. Thus, the wall strip may be formed to any desired shape to construct an intricate pattern without requiring any particular skill. With a little practice the side wall strip may be formed and secured to the bottom sheet very quickly and with the use of only a few pieces of adhesive tape. When this operation is completed, the cake pan will appear as shown in FIGURE 2. It will observed that there is no adhesive tape inside the pan where it would be in contact with the batter.

The next step is to cut the bottom sheet 10 on a line 30 at a distance out from the flange 17. Preferably, this distance is sufficient to allow material for a double fold of the marginal portion of the bottom sheet over the flange 17. The broken line 30 indicates the cutting line, since with a little practice it is not necessary to draw this outline on the bottom sheet. In forming the double fold at 31, the marginal portion 32 of the material of sheet 10 is pressed down firmly on flange 17 to make the joint as nearly liquid-tight as possible. Then, even if a relatively wet mix of batter is used, there will be no substantial leakage because the batter itself will tend to plug and seal any small crevices that may exist.

The double folds at 16 and 31 impart sufficient rigidity to the structure so that the pan will hold its shape when filled with batter, and the general rigidity or stiffness of the pan may be increased to the extent desired by using plural thicknesses of material in the bottom sheet and side wall strip as previously explained. Thus, if desired, the cake pan may be made sufficiently durable for repeated use, but, in any event, the expenditure of time and materials represents a small investment in relation to the time of baking the cake and the cost of its ingredients, which is an important object in providing a disposable cake pan.

Having now described my invention and in what man- ner the same may be used, what I claim as new and desire to protect by Letters Patent is:

1. The method of making a cake pan comprising providing a bottom sheet of metal foil, forming a side wall strip of metal foil and folding an outstanding longitudinal flange along one edge thereof, bending said strip to the desired configuration for said pan and applying adhesive tape to said flange and bottom sheet to hold said strip temporarily in place on said bottom sheet, cutting said bottom sheet around said side wall at a distance from said flange to form a marginal portion on said bottom sheet, and then folding said marginal portion over said flange and pressing said fold to a tight joint between said bottom sheet and side wall.

2. The method of making a cake pan comprising providing a bottom sheet of metal foil and securing the edges of said sheet to a flat surface, forming a side wall strip of metal foil having a double folded top edge portion and folding an outstanding flange on its bottom edge, forming said side wall strip to the desired shape of said pan and securing said flange to said bottom sheet with adhesive tape, securing end portions of said strip together with adhesive tape to form a sealed joint, cutting said bottom sheet around said wall at a distance from said flange to form a marginal portion of said bottom sheet projecting outwardly beyond said wall, and double folding said marginal portion over said flange in a tight joint.

3. The method of making a disposable cake pan comprising cutting a metal foil bottom sheet and securing edge portions of said sheet on a flat surface, drawing an outline of the shape of the pan on said bottom sheet, forming a metal foil side wall strip having a double folded top edge and folding an outstanding flange along its bottom edge, placing one end of said strip at a point on said outline and securing said flange at said end of said strip to said bottom sheet with adhesive tape, bending said strip from point to point to register with said outline and securing said flange to said bottom sheet at intervals around said outline with adhesive tape, cutting said bottom sheet at a distance outwardly from said wall to form a marginal portion in said bottom sheet extending outwardly from said flange whereby the portion of said bottom sheet connected with said flange is freed from said secured edge portions of said bottom sheet, and double folding said marginal portion of said bottom sheet over said flange and pressing said double fold into a tight joint.

References Cited in the file of this patent

UNITED STATES PATENTS

| | | |
|---|---|---|
| Re. 6,583 | Beardsley | Aug. 10, 1875 |
| 2,841,056 | Hincher | July 1, 1958 |
| 2,905,066 | Winkler | Sept. 22, 1959 |